Dec. 11, 1962
L. W. SCHULTZ
3,067,550
DRILL GRINDING STRUCTURE
Filed April 29, 1960
2 Sheets-Sheet 2
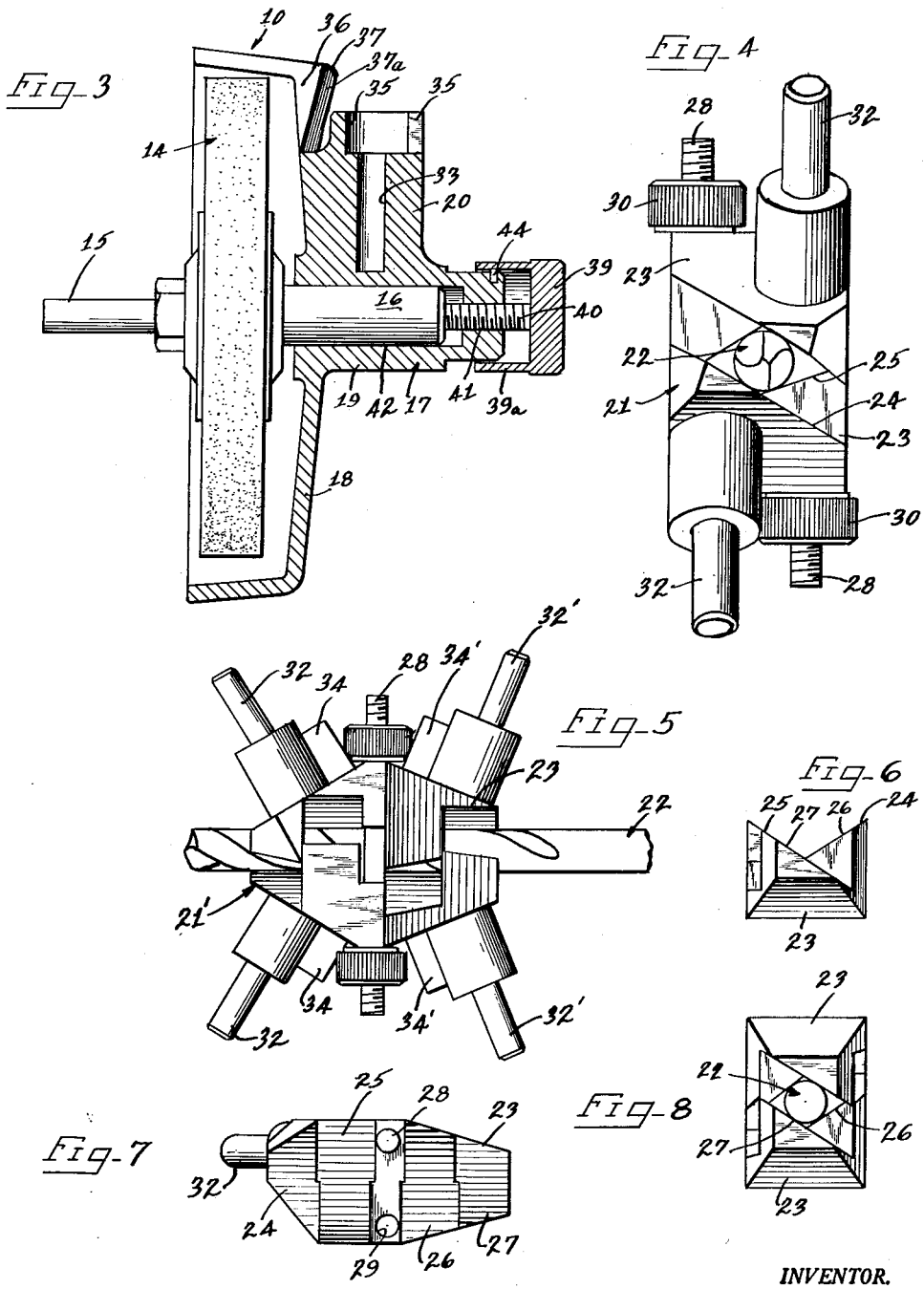
INVENTOR.
Louis W. Schultz

United States Patent Office 3,067,550
Patented Dec. 11, 1962

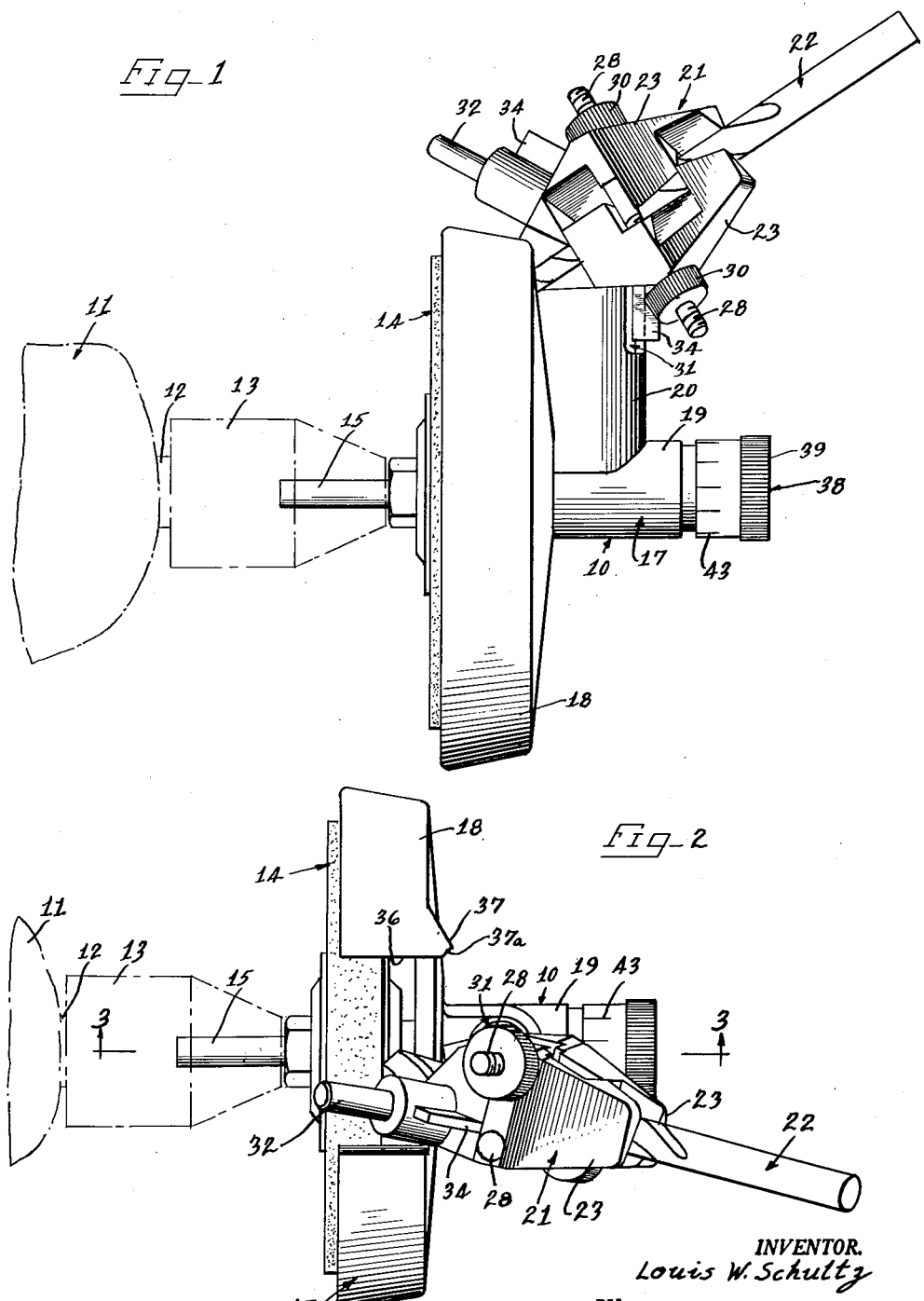

3,067,550
DRILL GRINDING STRUCTURE
Louis William Schultz, 1025 Jackson, Ave.,
River Forest, Ill.
Filed Apr. 29, 1960, Ser. No. 25,625
6 Claims. (Cl. 51—219)

The present invention relates generally to a drill grinding apparatus and more particularly to a portable drill grinder or drill grinding attachment adapted to be mounted on a motor drive shaft.

The instant drill grinding attachment is adapted to be used with a portable drill motor, a drill press, and the like. The power source or the motor drives a spindle having a chuck and the chuck is adapted to sustain the grinding wheel in assembly therewith. The outboard end of the shaft on which the grinding wheel is mounted is extended to provide a bearing support for the frame of the grinding attachment. The frame in turn supports a drill chucking device which positions the center line of the drill most suitably at a 59° angle from the plane in which the grinding wheel rotates. The drill chucking device also generates a 15° clearance angle from the chisel edge of the twist drill with increasing angular heel relief as the drill and its holder are rotated.

The drill chucking device is adapted to enable both chisel edges of a twist drill to be ground without first changing the position of the twist drill in the drill holder before the second twist drill chisel edge is ground. When the twist drill is assembled with the drill holder and after the first twist drill chisel edge is ground, the entire assembly including the twist drill and the drill holder are detachable from the drill grinder and manually rotatable 180° and reattachable to the drill grinder so that the second chisel edge of the twist drill may be ground identical to the first twist drill chisel edge. The drill holder is attached to the grinder by means of plugs which comprise pivot pins on which the drill holder rotates.

Many twist drills that are in common use today have chisel edges that are disposed at a 59° angle and have chisel edge heels that are disposed at a 15° relief angle. If other angles are desired the relation of the pivotal axis of the holder may be altered with respect to the axis of the drill when in the chisel holder. As a practical matter, the present grinder may be manufactured with a series of holders each of which is adapted to grind a different angle on a drill so that no manual adjustment is required.

In accordance with the present invention, once the twist drill is properly mounted in the drill holder, the chisel edges may be identically ground having the foregoing desired angles. This result is obtainable by using the new twist drill chisel edge aligning means to set the twist drill edge in a proper position on the drill holder with relation to the grinding attachment before the twist drill is clamped in assembly therewith; and then by disposing the drill holder pivots eccentrically of the axis of the drill so that each of the twist drill chisel edges may be rotated against the grinding wheel to grind the chisel edges at a desirable main cutting angle, such as 59°, and to further grind the heel of the chisel edge so that it will have a desirable relief angle, such as 15°.

According to other features of the present invention, the pivot pins are disposed in parallel planes at the same end of the holder and are spaced 180° from one another with the axis of the drill lying eccentric of but between the planes of the pivot pins.

An important object of the present invention is to provide a new type of drill grinding attachment which enables both chisel edges of a twist drill to be ground identically without rotating the drill relative to the holder once the drill has been clamped in assembly with the holder.

Yet another object of the present invention is to provide a low cost type of drill grinding attachment having a drill holder comprised of identical halves so that only one mold is required to form the holder.

Still another object of the present invention is to provide means on a drill grinding attachment for aligning the chisel edge in proper position with respect to the drill holder so that once the twist drill is clamped in assembly with the drill holder, the chisel edges may be properly presented to the grinding wheel for grinding.

Yet another object of the present invention is to provide a drill grinding attachment which may be economically manufactured at a low cost on a high production basis.

Still another object of the present invention is to provide a drill grinder attachment which may be more easily used with greater effectiveness by an ordinary person so that the ordinary person may sharpen his drills with ease, little effort and at a small cost.

According to the general features of the present invention there is provided a drill grinder comprising a grinding wheel guard and a shaft housing joined in assembly for carrying and sheltering a grinding wheel, a drill holder is pivotally mounted on the grinder adjacent to the grinding wheel for clamping a drill in assembly therewith, and pin and socket means is disposed between the drill holder and the grinder to enable the drill holder to be attached to the grinder to grind one face of a twist drill and then to enable the drill holder and the drill to be manually detached from the grinder and rotated together 180° and reattached to the grinder to enable another face of the twist drill to be ground without varying the position of the twist drill relative to the drill holder.

According to other features of the present invention, a thumb adjustment screw has been provided at one end of the shaft housing for moving the drill holder toward the grinding wheel to enable the drill to be ground at a controlled rate.

According to still another feature of the present invention, a drill holder has been provided having pivot pins at one end thereof which are disposed 180° apart and with the axis of the drill when in assembly with the drill holder being disposed between and eccentric to the planes of the pivot pins so that as the holder is rotated the chisel edges may be provided with increasing angular heel relief.

Other objects, features and advantages of the present invention will more fully become apparent in view of the following detailed description of a preferred embodiment, taken in conjunction with the accompanying drawings, in which:

FIGURE 1 is a side view of a drill grinder or drill grinding attachment with the broken lines indicating the manner in which it may be supported on a motor;

FIGURE 2 is a top view of the drill grinder shown in FIGURE 1;

FIGURE 3 is a vertical section taken through the drill grinder on the lines 3—3 as indicated in FIGURE 2 and with the grinding wheel being shown in elevation;

FIGURE 4 is a front end view of a drill holder having a drill in assembly therewith;

FIGURE 5 is a side view of the drill holder showing a modified construction;

FIGURE 6 is a rear end view of one of the halves comprising the drill holder of FIGURE 4;

FIGURE 7 is a top view of the drill holder half shown in FIGURE 6; and

FIGURE 8 is a rear end view of the drill holder only with certain details omitted.

As shown on the drawings:

The reference numeral 10 indicates generally my drill grinder or drill grinder attachment which embodies the features of the present invention. The drill grinder 10 is adapted to be used with a motor which may comprise a portable drill motor 11 having a drive shaft 12 and a chuck 13. A grinding wheel 14 is provided with a drive shaft 15 for assembly with the chuck 13. The grinding wheel 14 is further provided with a second drive shaft 16 which is adapted for assembly with the drill grinder 10. In actual use, once the grinding wheel is attached to the drill motor 11, the drill grinder attachment 10 is engaged over the grinding wheel shaft 16 and is freely movable axially of this shaft during the operation of the drill grinder attachment 10.

The drill grinder 10 includes a one-piece frame 17 which frame includes a grinding wheel guard 18 as well as a shaft housing 19 which is adapted to receive the grinding wheel shaft 16. The frame 11 may be comprised of any suitable material and may comprise an aluminum casting.

Formed as an integral part of the frame 17 is a drill holder mounting 20 which is attached along its vertical side wall to the grinding wheel guard 18 and which is attached at its base to the shaft housing 19. The drill holder mounting is adapted to support a drill holder 21 in assembly therewith. When the drill holder 21 is pivoted on the mounting 20, as will hereafter be described in further detail, the drill grinder 10 may be used to sharpen a drill, such as a twist drill 22.

The drill holder 21 is comprised of two identical preferably metal halves 23, 23. Since the halves are identical, a description of one of the halves will suffice for both of them. By manufacturing a drill holder of the type that is comprised of identical halves, the cost of manufacturing the drill holder may be kept to a minimum since only a single die need be acquired to produce the identical metal halves which constitute a major part of the drill holder. As will be best seen in FIGURES 6 and 7, each of the halves 23 has a series of converging drill engaging surfaces 24, 25, 26 and 27 which are inclined with respect to one another so as to form a V-shaped cavity for the receipt of the drill 22. When both of the halves 23 are engaged about a drill 22, the halves operate to contact the drill at a series of spaced points along the length of the drill 22 so that the drill may be rigidly held in place when the halves 23 are clamped in assembly together.

In order to secure the halves 23 together, each half is provided with a threaded bolt and a hole for the receipt of the shank of the bolt and it will be noted the bolt 28 and the hole 29 are spaced from one another generally at the middle of the drill holder half 23, as shown in FIGURE 7. The element 28 may comprise a bolt, a rod, a stud and the like and these terms, as used herein, are to be construed in a generic sense. When the halves are assembled together the bolts 28 and the holes 29 are adapted to be interengaged together and nuts 30 are provided to maintain the halves 23, 23 in clamped assembly with the drill 22.

In order to secure the drill holder 21 in assembly with the frame 17, pin and socket means indicated generally at 31 are provided to attain this end. As illustrated, the drill holder 21 is provided with a pair of pivot pins 32, 32 and the drill holder mounting is provided with a pin receiving socket 33 (FIGURE 3). The socket 33 is adapted to receive either of the pins 32 since the pins are identical to one another. If desired, the drill holder 21 could be provided with a pair of sockets instead of a pair of pins and the drill holder mounting could be provided with a single pin instead of a socket by merely reversing the parts. The pins or the pin bosses 32, 32 are both disposed at one end of the drill holder 21 and extend in parallel planes but are spaced 180° apart and the longitudinal axis of the drill holder 21 is eccentric to but disposed between the planes of the pivot pins 32, 32. By disposing the pivot pins in this particular relation with respect to the longitudinal axis of the drill holder and the drill, both chisel faces or edges may be ground having a 59° angle as well as a 15° relief angle.

If the drill is to have some other different angle rather than the standard 59° angle then a different holder 21 would be used which would have its pin bosses mounted on the halves in a slightly different way so that the drill could have its edges ground in the desired manner. In order to provide the drill with a chisel edge having a different angle, this result may be obtained by using a modified drill holder 21' as shown in FIGURE 5. The same reference numerals have been used where applicable. The drill holder 21' is identical to the drill holder 21 except pivot pins 32', 32' and stops 34', 34' have been added to the holder so that it has pins at both ends so the holder may be used to grind two different drill point angles. The pins 32', 32' are the same as the pins 32, 32 except they are disposed at a different angle such as 30°, 49°, 68° or 88°.

In order to limit the rotation of the holder 21 when it is mounted on the frame 17, each of the pins 32 are provided with a pin stop 34 and the drill holder mounting is provided with a pair of mounting stops 35, 35 which are cooperable with the pin stops 34, 34. In FIGURE 3, it will be seen that the stops 35, 35 are spaced aproximately 90° apart. By providing stop means between the frame and the holder, the arc of rotation of the holder with respect to the frame may be limited so that the chisel edge on the drill may be ground to a predetermined clearance angle such as 15°.

The drill guard 18 has a recessed area 36 in order to permit the drill to be engaged against the grinding wheel 14. The recessed edge area 36 is provided with drill edge aligning or centering means indicated generally at 37 which is formed integral with the frame casting 17. The centering means 37 includes a centering face or edge 37a which is disposed at the desired angle that it is intended that the chisel edge be disposed at when the holder is rotated on its pin to bring the chisel face or edge into contact with the grinding wheel. The centering face or edge 37a may be disposed at a 20° angle.

A thumb screw mechanism has been provided to move the frame and the holder relative to an axial side of the grinding wheel. The thumb screw mechanism 38 comprises a knurled cap 39 having a screw 40 secured to the cap in the inside thereof. The drill housing has a threaded bore 41 for the receipt of the threaded screw 40 as well as an axial bearing bore 42 for the receipt of the drill grinder shaft 16. As is shown in FIGURE 3, when the cap 39 is rotated, the frame 17 may be moved axially of the grinding wheel as a consequence of the engagement of the screw 40 with the shaft 16. In order to guide the operator in the rotation of the cap 39, the cap has a series of lines or markings 43 circumferentially spaced at the open end of the cap. When the operator has finished grinding one chisel edge, he will take a reading from the markings 43 so that when he grinds the opposite chisel face or edge, he will grind it to the same extent as the first chisel edge or face.

In order to prevent the cap 39 from becoming accidentally disengaged from the shaft housing 19, a lock cap element 44 is embedded in the end of the shaft housing 19 in underlying relation to a flanged end 39a of the cap 39. When the cap is in assembly on the shaft housing 19, the flanged end 39a will be sprung slightly radically by the nylon or synthetic plastic element 44 to insure a tight fit so that the cap 39 may be moved axially with comparative ease and so that it will not rotate relative to the shaft housing 19 unless it is manually manipulated.

In the operation of the attachment, the thumb screw mechanism 38 is disposed at one end of the shaft housing 19 so that it may be turned clockwise until it reaches the end of its thread. Then the drill 22 is assembled with the holder, by placing it between the halves, and the nuts 30 are turned until the drill is loosely engaged by the halves 23, 23. The twist drill chisel edge or face that is to be ground is then placed flat against the drill edge centering face 37a or in parallel alignment with respect to the face 37a. The nuts are then turned until the drill is tightly clamped between the halves. The holder 21 and the drill 22 are then rotated in an arc to make sure the point clears the grinding wheel. After the motor has been started and the griding wheel is rotating, the thumb screw mechanism 38 is rotated to permit the frame 17 as well as the drill holder 21 to be moved in closer proximity to the grinding wheel 14 so that the chisel edge that is to be ground will contact the wheel and as the holder is rotated the drill chisel edge will be ground to the desired extent. As discussed previously, most twist drills have chisel edges which are disposed at a 59° angle with a 15° relief or clearance angle.

After the first chisel edge or face on the twist drill 22 has been ground according to the desired extent, the drill holder is disengaged from the drill holder mounting by disengaging the pin 32 from the drill mounting socket 33. The holder is then rotated 180° and the other pin 32 is inserted within the drill holder socket 33 and the opposite edge or face of the twist drill is ground so that it is identical with the first chisel edge or face. In grinding the second chisel edge or face it will be appreciated that the thumb screw mechanism 38 must first be turned relative to the shaft housing 19 so that the frame 10 may be backed away from the grinding wheel 14 a slight extent to begin the grinding process. Then to grind the edge, the thumb screw mechanism 38 is rotated in an opposite direction to advance the chisel edge or face into the wheel to further grind the chisel edge or face until the reading on the thumb screw mechanism 38 is the same as it was after the grinding of the first chisel edge had been finished.

The drill holder 21 on the attachment 10 is of a simple design and is capable of pointing any size of drill such as a drill having a ½-inch diameter. This attachment is capable of grinding carbide masonry drills in addition to other types of drills. One very important advantage which is obtained through the use of the instant attachment is that the edges on the drill may be ground so that they are identical to one another for improved performance.

Yet another important advantage of the present attachment is that the drill need only be clamped to the holder once while sharpening both of its chisel edges. The instant attachment may be used with an electric drill which many people have in their homes and it is capable of sharpening drills having standard angles.

It will be understood that modifications and variations may be effected without departing from the scope of the novel concepts of the present invention.

I claim as my invention:

1. A drill grinder attachment for use with a portable electric drill including a grinding wheel having a wheel supporting shaft at one side, an attachment assembly including a shaft housing and a grinding wheel guard, said grinding wheel guard being mounted at one end of said shaft housing about its longitudinal axis and with said wheel supporting shaft extended axially across the guard and journalled in said shaft housing, the guard having a radial slot which exposes said one side of said grinding wheel, a drill holder mounted on said attachment assembly having a drill holder opening aligned with said radial slot and the side of said grinding wheel so a drill can be carried by said drill holder in the drill holder opening by the side of said grinding wheel, pin and socket means extending radially of said shaft housing and joining said drill holder with the attachment assembly enabling the drill holder to be rotated relative to said radial slot and the side of said grinding wheel to sharpen a drill point against said grinding wheel, said pin and socket means enabling the drill holder and the drill to be manually detached from the attachment assembly and rotated together 180° and reattached to the attachment assembly to enable another face of the twist drill to be ground without varying the position of the twist drill in the drill holder, the pin and socket means including a pair of pivots disposed on the drill holder but spaced 180° apart and with said longitudinal axis of the drill holder along which the drill is adapted to be disposed being positioned between the axes of said pivots so that when the holder is rotated 180° on said attachment assembly each of the chisel edges may be ground having a relief angle along its length, and means for varying axial spacing between said holder and said grinding wheel comprising a thumb screw mounted on said shaft housing having an end engaged with said wheel supporting shaft.

2. A drill grinder attachment assembly including a shaft housing and a grinding wheel guard, the shaft housing having a journal for the receipt of a grinding wheel shaft therein and said grinding wheel guard being mounted at one end of said shaft housing about its longitudinal axis, the guard having a radial slot which enables the exposure of an axial side of a grinding wheel, a drill holder mounted on said attachment assembly having a drill holder opening aligned with said radial slot and the side of said grinding wheel so a drill carried by said drill holder in the drill holder opening may be ground by an axial side of a grinding wheel, and an adjustment screw secured with an opposite end of said shaft housing for engagement against a grinding wheel shaft when journalled in said housing for varying the axial spacing between the drill holder and the side of a grinding wheel.

3. The attachment assembly of claim 2 further characterized by said slot having drill edge aligning means adjacent thereto including an aligning face which is disposed at the desired angle that it is intended that the chisel edge be disposed at when the holder is rotated to bring the chisel edge into contact with the mounting wheel.

4. The attachment assembly of claim 3 further characterized by said aligning face being disposed at a 20° angle.

5. The attachment assembly of claim 2 further characterized by said holder comprising two identical halves, each of said halves having a bolt and a bolt hole disposed along the length thereof and a set of nuts securing said bolts in said bolt holes when said bolts are engaged within the bolt holes and maintaining the halves in position for clamping a drill, said halves each having a series of longitudinally spaced converging drill engaging surfaces for engaging a drill at longitudinally spaced intervals along the length of a drill, and a pin boss on each of said halves extending away from one another at one end of said holder in spaced relation to one another, said pin bosses comprising means for mounting said holder on a drill grinder so that the holder may be rotated 180° on the drill grinder to grind opposite faces of a twist drill without turning the twist drill relative to the holder.

6. The attachment assembly of claim 5 further characterized by a drill holder having a second set of pin bosses in said halves extending away from one another at another end of said holder for mounting another type of drill point, said first set of pin bosses being disposed at one angle with respect to the axis of a drill secured between the halves and with said second set of pin bosses being disposed at another and different angle with respect to the axis of a drill secured between the halves.

References Cited in the file of this patent

UNITED STATES PATENTS

| 166,515 | Eddy | Aug. 10, 1875 |
| 2,220,326 | Haskell | Nov. 5, 1940 |
| 2,295,265 | Morris | Sept. 8, 1942 |
| 2,486,335 | Smith et al. | Oct. 25, 1949 |
| 2,829,473 | Pruner | Apr. 8, 1958 |

FOREIGN PATENTS

| 13,091 | Great Britain | July 20, 1916 |